United States Patent [19]
Harris

[11] Patent Number: 5,566,705
[45] Date of Patent: Oct. 22, 1996

[54] SNAP-CLOSURE FLOAT VALVE ASSEMBLY

[75] Inventor: Robert S. Harris, Connersville, Ind.

[73] Assignee: Stant Manufacturing Inc., Connersville, Ind.

[21] Appl. No.: 497,217

[22] Filed: Jun. 30, 1995

[51] Int. Cl.[6] ................................................ F16K 31/34
[52] U.S. Cl. ............................ 137/43; 137/202; 137/493
[58] Field of Search ............................... 137/43, 202, 493

[56] References Cited

U.S. PATENT DOCUMENTS

| | | | |
|---|---|---|---|
| 4,351,350 | 9/1982 | Crute | 137/39 |
| 4,655,328 | 4/1987 | Szlaga | 137/43 |
| 4,694,847 | 9/1987 | Szlaga | 137/39 |
| 4,735,226 | 4/1988 | Szlaga | 137/43 |
| 4,760,858 | 8/1988 | Szlaga | 137/43 |
| 4,953,583 | 9/1990 | Szlaga | 137/118 |
| 4,991,615 | 2/1991 | Szlaga et al. | 137/170 |
| 5,028,244 | 7/1991 | Szlaga | 55/170 |
| 5,044,397 | 9/1991 | Szlaga et al. | 137/587 |
| 5,065,782 | 11/1991 | Szlaga | 55/43 |
| 5,116,257 | 5/1992 | Szalga | 137/43 |
| 5,156,178 | 10/1992 | Harris | 137/43 |
| 5,234,013 | 8/1993 | Roetker et al. | 137/43 |
| 5,318,069 | 6/1994 | Harris | 137/588 |
| 5,388,611 | 2/1995 | Harris | 137/588 |
| 5,449,029 | 9/1995 | Harris | 141/198 |

*Primary Examiner*—Gerald A. Michalsky
*Attorney, Agent, or Firm*—Barnes & Thornburg

[57] ABSTRACT

An apparatus is provided for controlling flow of fuel vapor and liquid fuel through an aperture in a fuel tank. The apparatus includes a housing mounted in the aperture and a vent valve movable in the housing to block flow of fuel vapor between the fuel tank and an outlet. The housing is further formed to include a float valve movable between a closed position blocking flow of fuel vapor and liquid fuel through the outlet and an open position allowing flow of fuel vapor through the outlet. The float valve includes a wide-diameter base, an upwardly extending closure appended to the base member, and a downwardly extending narrow-diameter weighted unit depending from the base. The base and the weighted unit are sized, shaped, weighted, and located to cause the float valve to "snap" (e.g. move quickly and suddenly) to its closed position after rising fuel in the fuel tank rises past the weighted unit and engages the underside of the base.

44 Claims, 3 Drawing Sheets

SNAP-CLOSURE FLOAT VALVE ASSEMBLY

BACKGROUND AND SUMMARY OF THE INVENTION

The present invention relates to tank pressure control systems, and in particular to an apparatus for controlling flow of fuel vapor and liquid fuel through an aperture in a fuel tank. More particularly, the present invention relates to a tank venting control assembly having a float valve that snap closes quickly and automatically to prevent discharge of fuel vapor and liquid fuel from the fuel tank during refueling, agitation of the tank, or vehicle rollover.

Fuel vapor can be created in the fuel tank by temperature differences between the fuel tank and liquid fuel from a fuel pump, as well as by sloshing and agitation of the fuel tank during normal vehicle operation. The pressure buildup resulting from the creation of new fuel vapors must be relieved properly. For this reason, many vehicle fuel systems are equipped with tank venting control assemblies capable of discharging a relatively large amount of fuel vapor in response to the development of high pressure conditions in the fuel tank. See, for example, U.S. Pat. No. 5,234,013 to Roetker et al. Typically tank venting control assemblies also include float valves to provide rollover closure and aid overfill shutoff functions. For a description of such a float valve, see U.S. Pat. No. 5,065,782 to Szlaga.

It has long been desirable to maximize the sensitivity that can be achieved with tank venting control assemblies while at the same time minimizing manufacturing costs and assembly difficulties. It would be desirable to provide a tank venting control assembly sensitive enough to begin discharging fuel vapor from the fuel tank in response to pressure differentials as low as about 1–2 inches (2.5–5.1 cm) of water. In fact, a valve design meeting these requirements would closely simulate an open orifice. In any event, meeting the sensitivity requirement calls for a valve which can develop a relatively high actuation force in response to relatively low pressure differentials, long the focus of engineering efforts in this area.

Some tank venting control assemblies have relied upon the use of a small amount of fuel vapor from the fuel tank to provide a pressure signal to actuate the venting assembly, allowing discharge of large volumes of fuel vapor from the fuel tank. Such systems are disclosed, for example, in U.S. Pat. Nos. 4,953,583 and 5,065,782. However, it has proven difficult to design such systems to achieve the desired sensitivity without compromising manufacturability.

In addition to providing for adequate fuel vapor discharge from the fuel tank during high tank pressure conditions, well-designed tank pressure control assemblies must be capable of responding to the reduction of pressure in the fuel tank to below a predetermined level. These tank vacuum conditions are usually relieved by introducing ambient air to the fuel tank to bring the fuel vapor pressure in the fuel tank back to approximately atmospheric pressure. However, it has long been problematic to provide adequate tank vacuum relief functions without complicating the tank venting control assembly unnecessarily.

Further, it has long been appreciated that venting control assemblies should provide means for preventing liquid fuel leakage during tilting or rollover of the vehicle (see e.g., U.S. Pat. Nos. 4,351,350; 4,655,328; and 4,760,858). However, venting control assemblies allowing discharge of high mass flow rates of fuel vapor should also provide means for reducing discharge of liquid fuel even when the fuel tank is in its normal upright position.

Tank pressure control systems typically include a float valve therein in order to control this discharge of liquid fuel as shown, for example, in U.S. Pat. No. 5,065,782. It is well understood that said float valve becomes buoyant once the buoyant force (the product of a cross-sectional area of the float valve, submerged height of the float valve, and specific gravity of fluid surrounding the float valve) overcomes the weight of the float valve. Often these float valves are designed to include a bottom end having either a structure with a constant cross-sectional area or a cross-sectional area that gradually increases as the fluid level rises within the fuel tank. As rising fluid meets either of these types of bottom ends, the fluid surrounds the outer periphery of the valve and causes the submerged height of the valve to increase while the perceived cross-sectional area remains constant or increases gradually.

Under circumstances such as these, the only variable within the buoyancy equation undergoing significant change is the submerged height of the valve. Thus, float valves that behave as substantially uniform cross-sectional structures, rise at a rate proportional to the rate of the rising fluid. This proportional rise could however lead to premature closure problems under high fluid-flow conditions within the fuel tank. To overcome premature closure at high fluid-flow conditions, manufacturers often position the float valve within the housing from about 3.18 mm to 6.35 mm away from the desired closed position. However, increases in travel distance to the closed position can result in a reduction in pressure sensitivity of the valve. What is needed is a venting control assembly that maximizes the sensitivity of a float valve to pre-determined closing conditions while at the same time reducing the incidence of premature closure of the valve.

According to the present invention, an apparatus is provided for controlling venting of fuel vapor through an aperture in a vehicle fuel tank and for introducing air into the fuel tank in response to the development of vacuum conditions therein. The apparatus includes a housing which is mounted in the aperture of the fuel tank and has an upper chamber, a lower chamber, and a float valve disposed in the lower chamber of the housing. The housing is further formed to include an outlet and defines a vent path for fuel vapor between the fuel tank and the outlet.

The float valve is movable within the lower chamber of the housing between a closed position blocking flow of fuel vapor and liquid fuel through the vent path and an open venting position. The float valve has a vertical axis extending therethrough and includes a base having an upper end and a lower end, an upwardly-extending closure member appended to the upper end of the base and formed to include a vent aperture closure cap, and a downwardly-extending, elongated, weighted unit depending from the lower end of the base. The vent aperture closure cap is sized and shaped to close the vent path formed in the housing when the float valve lies in its closed position.

The lower end of the base has a first downwardly-presented surface of a predetermined cross-sectional area that is positioned on the float valve to lie at a position coinciding with the fluid level in the fuel tank when the vent aperture closure cap moves to a position closing the vent aperture in the fuel tank. The weighted unit has a second downwardly-presented surface positioned to lie in axially spaced-apart relation to the first downwardly-presented surface. The second downwardly presented surface has a cross-sectional area that is less than the predetermined cross-sectional area of the first downwardly-presented surface.

The base and the weighted unit are sized, shaped, weighted, and located to cause the float valve to "snap" (e.g. move quickly) to its closed position after rising fuel in the fuel tank rises past the weighted unit and engages the first downwardly-presented surface on the lower end of the base. A float valve in accordance with the present invention is designed to sense and react to predetermined closing conditions quickly yet reduce the incidence of premature closure.

In one embodiment, the float valve is a unitary member formed to include a gas-tight hollow chamber containing the weighted member. In other embodiments, the float valve is a two-piece or multi-piece member formed to include a gas-tight hollow chamber containing the weighted member. In yet another embodiment, the float valve is a unitary, solid core member made of a properly weighted material without a separate weighted member. Illustratively, a float valve in accordance with the present invention includes a skirt, ribs, or other means for guiding movement of the float valve in the housing as the level of liquid fuel in the fuel tank rise and falls.

In a presently preferred embodiment, the float valve includes a body and a conical upper lid having an underside coupled to the body. The body of the float valve includes a cylindrical cup-shaped barrier, an annular lip extending radially outwardly from the barrier, and a skirt extending from the lip about the barrier. The skirt in effect forms a float chamber bounded by the barrier, the lip, and the skirt. The presence of the skirt, below the annular lip, must remain transparent to slowly rising fuel.

The skirt of the body remains transparent to the rising fuel due to vents therethrough which displace fuel vapor from the float chamber. The vents permit fluid flow into the flow chamber so that body becomes buoyant and snaps to the closed position only after the fluid has risen substantially close to the pre-selected closure conditions. It is understood that the vents are situated through the skirt adjacent to the lip so that the fluid rises through the float chamber as the skirt of the valve becomes submerged in the surrounding fluid. Only after the fluid has significantly submerged the skirt does it flow from the float chamber and into the vents of the skirt.

Fluid flow into the vents causes the body to behave as a solid cross-sectional structure which prevents further increases in fluid level within the flow chamber. Preferably, the vents are positioned adjacent the lip so that the rising fluid engages the lip. Thus, the combination of the submerged height of the valve with the sudden increase in the cross-sectional area as perceived by the rising fluid causes the valve to "snap" to the closed position. Thus, the float valve has a reduced dependency upon submerged height of the valve which is a source of premature closure, but has an increased sensitivity to predetermined closure conditions. This has the practical effect of making the float valve much more responsive to sudden sharp changes in fuel level such as when a vehicle carrying a fuel tank containing the float valve is driven on very rough road.

In other embodiments of the present invention, the float valve includes an upper float wall, a lower float wall, and a hollow gas-tight region formed between the upper and lower float walls. The lower float wall includes a lip and means for snapping the upper float wall to the closed position upon engagement of rising fluid with the lip. Illustratively, the upper flow wall is integral with the lower float wall.

In addition, the upper float wall includes a cap and the lower float wall includes a body. The body has a barrier coupled to the lip so that the lip extends radially outwardly from the barrier to create a flow chamber defined by the barrier and the lip.

In yet another embodiment of the present invention, a float valve is provided for use in an apparatus for controlling venting of fuel vapor through an aperture in a vehicle fuel tank. The float valve includes an upper float wall and a lower float wall formed to include a hollow barrier having a substantially constant cross-sectional area and a lip extending radially outwardly from the barrier. The lip has a cross-sectional area greater than cross-sectional area of the barrier so that a product of a cross-sectional area of the float valve, submerged height of the float valve, and specific gravity of fluid surrounding the float valve overcomes the weight of the float valve when the rising fluid engages the lip. Thus, the upper float wall moves toward its closed position.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE DRAWINGS

Figure 1:
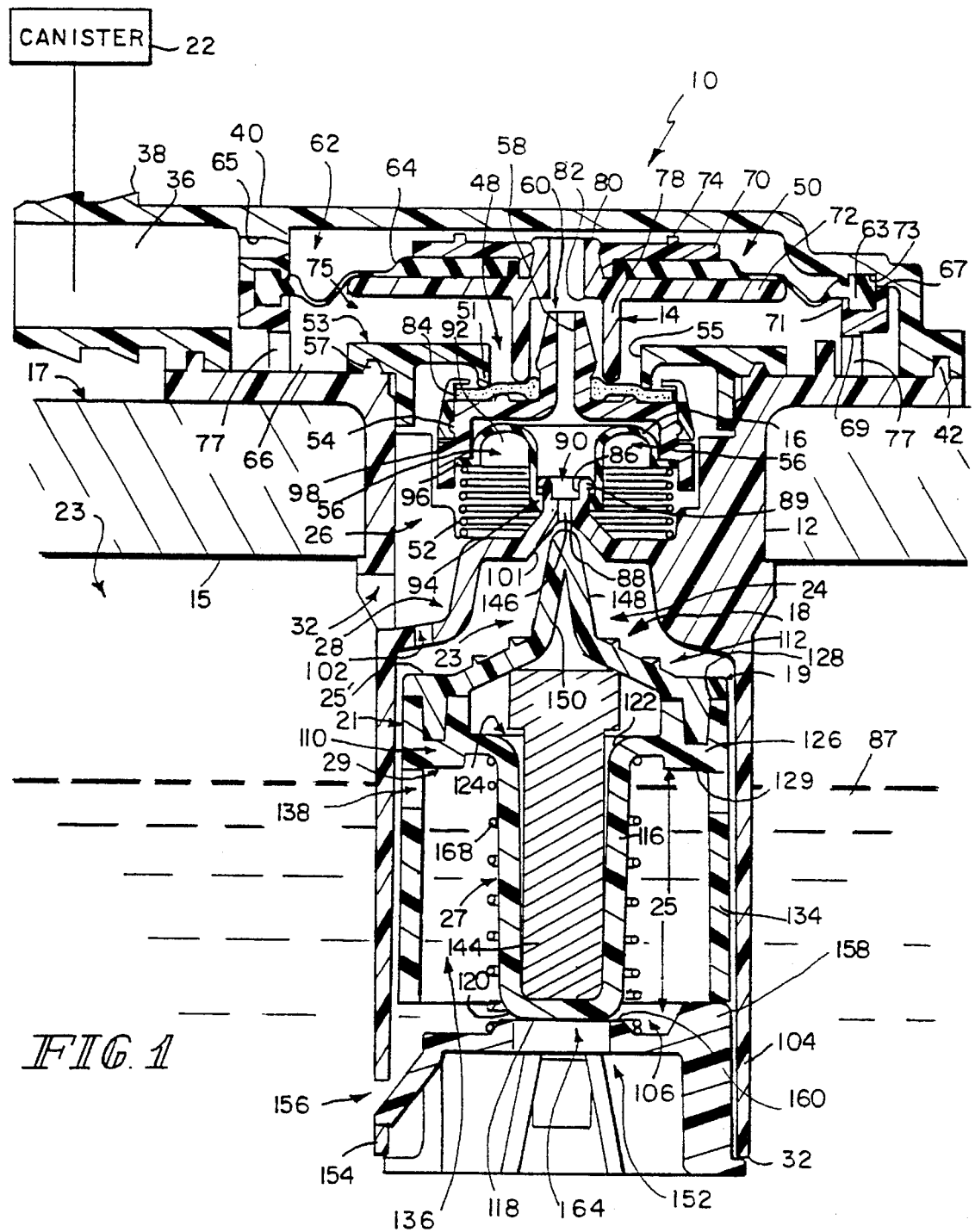
FIG. 1 is a sectional view of a tank venting control apparatus containing a float valve in accordance with the present invention, the apparatus including a housing having an upper chamber and a lower chamber divided by a flow shield, an annular valve positioned in the upper chamber, and a lower retainer coupled to the housing, the float valve being positioned in the lower chamber between the flow shield and the retainer, the float valve having a barrier, an annular lip extending outwardly therefrom, an a skirt extending from the lip about the circumference of the barrier, the skirt including an vent therethrough which is situated adjacent the lip, and showing the float valve in a venting position allowing venting of fuel vapor during refilling and fuel tank agitation.

A tank venting control apparatus 10 in accordance with the present invention is illustrated in FIG. 1. Apparatus 10 is shown to include a housing 12, a valve assembly 14, a flexible partition 16 cooperating to provide venting of excess fuel vapor pressure from the fuel tank 17 through valve assembly 14 to an appropriate treatment device such as vapor recovery canister 22, and a float valve assembly 18.

Apparatus 10 is designed to be sealingly mounted in an aperture formed in a top wall 21 of a vehicle fuel tank 17 having an interior region 23. The rollover-float valve assembly 18 is formed in such a way that it includes a float valve 19 that moves, i.e. undergoes "snap" closure, within the housing 12 after liquid fuel 87 has reached a pre-determined level as illustrated by arrow 140 in the fuel tank 17. Further, due to this "snap" closure, the float valve 19 may be situated in its fully open venting position (shown in FIG. 1) within a short distance (i.e. about 1 mm) of its closed position (shown in FIG. 2). Thus, the float valve 19 possesses increased sensitivity to changes in tank fuel vapor pressure while having reduced tendency to close prematurely at high fuel flow rates.

The float valve 19 shown in FIG. 1 includes a base 21, a closure member 23 appended to an upper end 25 of base 21, and a weighted unit 27 depending from a lower end 29 of base 21. The diameter of the weighted unit is less than the diameter of base 21. The float valve 19 in FIG. 1 also includes a thin-walled annular skirt 134 depending from lower end 29 of base 21 and surrounding the cylindrical weighted unit 27.

Figure 3:
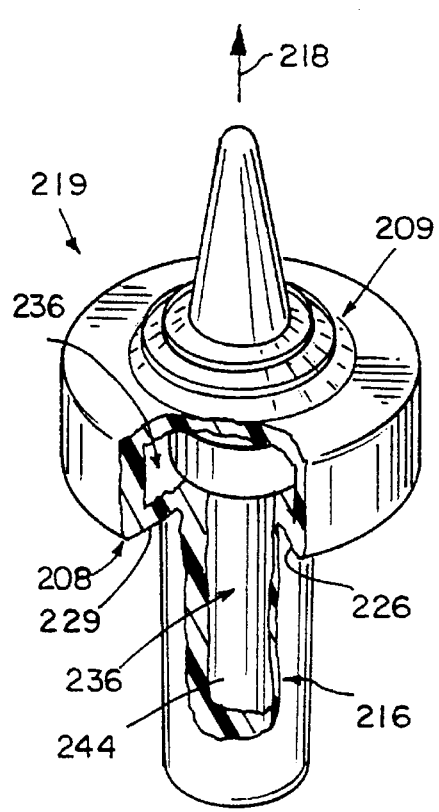
FIG. 3 is a diagrammatical perspective view, with a portion broken away, of another embodiment of a unitary float valve in accordance with the present invention showing the float valve including a base, a closure member appended to an upper end of the base, and a weighted unit depending from a lower end of the base, and a weighted member contained in a gas-tight hollow chamber in the float valve.
Figure 4:
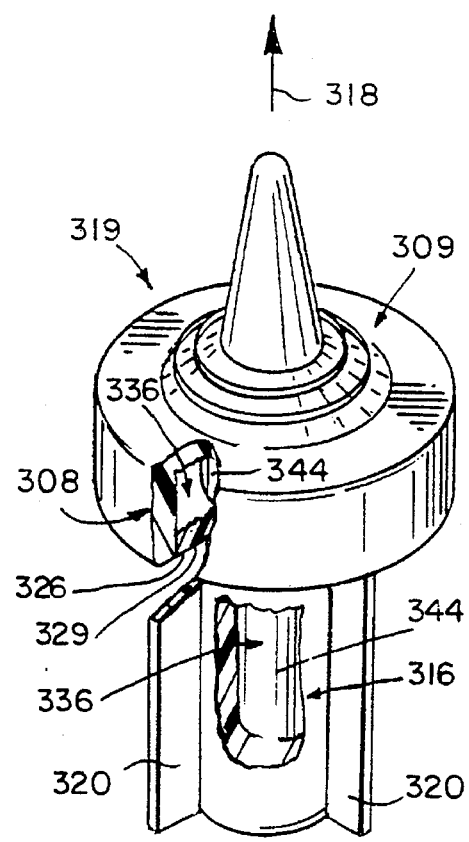
FIG. 4 is a diagrammatical perspective view, with a portion broken away, of yet another embodiment of a two-piece float valve in accordance with the present invention showing the float valve having a hollow upper float wall, a lower float wall affixed to the upper float wall, a weighted member contained in a gas-tight hollow chamber in the float valve, and guide ribs.
Figure 5:
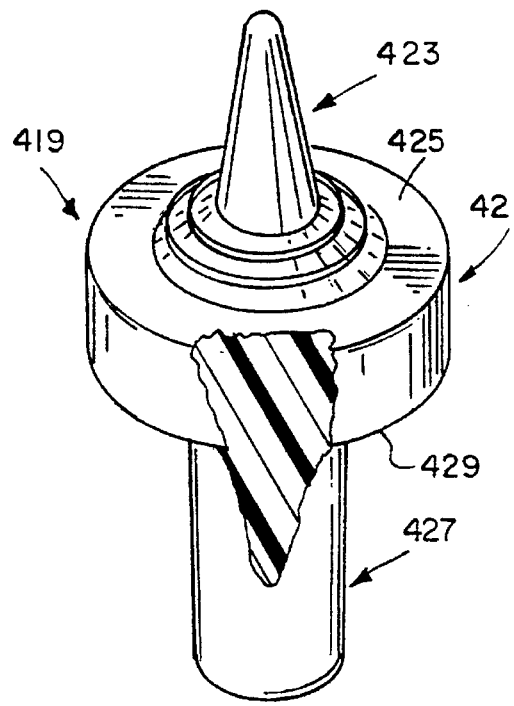
FIG. 5 is a diagrammatical perspective view, with a portion broken away, of a unitary, solid core float valve in accordance with still another embodiment of the invention.

Other embodiments of a snap-closure float valve in accordance with the present invention are shown in FIGS. 3–5. Float valve 219 shown in FIG. 3 is a unitary member formed without a skirt to include a gas-tight chamber 236 containing a weighted member 244. Float valve 319 shown in FIG. 4 is a two-piece member formed to include a gas-tight chamber 336 containing a weighted member 344. Instead of a guide skirt like skirt 134, float valve 319 includes four circumferentially spaced-apart axially extending guide ribs 320. Float valve 419 shown in FIG. 5 is a unitary, solid core member having a wide diameter base, closure member, and narrow diameter post without a hollow chamber or separate weighted member therein. Essentially, a heavy material such as a phenolic plastic is used to form float valve 419 so that a separate weighted member is not needed. One or more of guide ribs 330 shown in FIG. 4 could be added to the float valve shown in FIGS. 3 and 5.

Various features and advantages of the float valves disclosed in FIGS. 1–5 will be discussed below in connection with a description of those float valves. Essentially, the float valves are sized and shaped to "snap" (e.g. move quickly) to a vent closing position whenever such closure is necessary. Thus, they are sensitive to various environmental conditions of the type that create a need to close a venting aperture in a fuel tank.

Housing 12 is formed to include a hollow interior which is divided by a flow shield 28 into a lower chamber 24 and an upper chamber 26. Lower chamber 24 contains the rollover-float valve assembly 18, while upper chamber 26 contains valve assembly 14 and partition 16.

Housing 12 is formed to include a plurality of inlet openings or windows 32 which allow fuel vapor from the fuel tank 17 to pass into upper chamber 26. Inlet openings 32 are sized to permit relatively large volumes of fuel vapor to pass into upper chamber 26 for eventual venting through upper chamber 26 to canister 22 as will be subsequently described. Housing 12 may also be formed to include a plurality of relatively small diameter inlet openings (not shown) which allow a relatively small volume of fuel vapor from the fuel tank 17 to enter lower chamber 24. This relatively small volume of fuel vapor is transported to upper chamber 26 to serve as a pressure signal for actuating valve assembly 14 as will be subsequently described.

Housing 12 is also formed to include an outlet 36 which allows passage of fuel vapor from housing 12 to canister 22. In particular, an outlet tube 38 is formed in a cover 40 of housing 12. Cover 40 is designed for snap fitting engagement in a groove 42. An O-ring or other seal member 44 is provided to seal the joint where cover 40 snaps into groove 42. Housing 12 thus defines a vent path for fuel vapor between the fuel tank 17 and outlet 36.

The flow of fuel vapor along the vent path is controlled by valve assembly 14. Valve assembly 14 includes the valve 48 and a valve actuator 50. Valve 48 is typically of a variety of valves known as "poppet" valves.

When the valve 48 is in a blocking position (shown in both FIGS. 1 and 2), valve 48 seats against a surface 51 of a partition 53 providing a valve seat. Partition 53 is preferably an annular insert formed to include an opening 55. A tab 57 is provided on the housing 12 for interlocking engagement with partition 53. It is understood that a gasket may also be provided to ensure sealing engagement between partition 53 and the inner valve of housing 12. Valve 48, when thus seated, blocks flow of fuel vapor between the fuel tank 17 and outlet 36 along the vent path. When moved away from the surface 51 to its venting position, (not shown), valve 48 allows flow of fuel vapor between the fuel tank 17 and outlet 36 along the vent path. For further description of the venting position of the valve 48, see U.S. Pat. No. 5,234,013 which is incorporated herein by reference. Valve assembly 14 also includes a spring 52 acting between flow shield 28 and valve 48 to bias the valve 48 towards its blocking position.

Valve 48 includes an inverted cup 54 defining an interior region 56. Valve 48 also includes an upstanding sleeve 58 projecting from the central portion of inverted cup 54. Cup 54 is formed to include an opening 60 linking interior region 56 and the interior of sleeve 58 in fluid communication. Opening 60 serves as an inlet opening for sleeve 58.

Valve actuator 50 is provided to move valve 48 from its blocking position against spring 52 to the venting position (not shown) when the fuel vapor pressure in the fuel tank 17 exceeds a pre-determined level. Fuel vapor from the fuel tank 17 is used to depress valve actuator 50 which in turn urges valve 48 toward the venting position.

Valve actuator 50 includes a diaphragm 64 or other suitable resilient sealing material having its peripheral edge mounted between an insert 66 and cover 40. Insert 66 is preferably a ring-shaped support member having an upper circular support portion 67 and a lower wall portion 69. Upper support portion 67 is formed to include a groove 71 sized to receive a peripheral edge 63 of diaphragm 64. Groove 71 aligns with a similar groove 73 formed in cover 40, cooperating therewith to provide a recess for receiving and supporting peripheral edge 63 of diaphragm 64.

Lower wall portion 69 cooperates with the underside of diaphragm 64 to define a chamber 75 beneath diaphragm 64. Lower wall portion 69 is preferably formed to include four equally spaced rectangular openings 77 serving as outlet apertures for chamber 75 for controlled release of fuel vapor from chamber 75. Fuel vapor venting past valve 48 through opening 55 enters chamber 75, where it is momentarily retained until it can pass through rectangular openings 77 to outlet 36.

Diaphragm 64 cooperates with cover 40 to define a venting control chamber 62 for receiving and using a fuel vapor signal from lower chamber 24 to apply pressure against diaphragm 64. Cover 40 is formed to include a bleed passageway 65 to connect venting control chamber 62 in fluid communication with outlet tube 38. Thus, fuel vapor accumulating in venting control chamber 62 eventually dissipates through bleed passageway 65 to outlet tube 38 and then to outlet 36.

Diaphragm 64 is movable in response to an accumulation of fuel vapor pressure in venting control chamber 62 between a static position allowing valve 48 to remain in its blocking position seated against valve seat 51 (as shown in FIG. 1) and a actuating position urging valve 48 away from seat 51 against the bias of spring 52 toward its venting position (not shown). Advantageously, fuel vapor temporarily retained in chamber 62 assists in returning diaphragm 64 to its static position when venting from the fuel tank 17 is no longer necessary. A pair of rigid plastic backing plates 70 and 72 sandwich diaphragm 64.

Backing plate 70 includes a pair of spaced-apart straight ridges 74. Ridges 74 assist in temporarily capturing fuel vapor in the central portion of venting control chamber 62 to ensure that fuel vapor pressure acts across the central portion of diaphragm 64 instead of dissipating to outer portions of the venting control chamber 62 and escaping to outlet tube 38 by way of the bleed passageway 65 formed between venting control chamber 62 and outlet tube 38.

Backing plate 72 is formed to include a depending sleeve 78. An upper portion 80 of sleeve 78 projects through a central opening formed in diaphragm 64. Advantageously, sleeve 78 cooperates with sleeve 58 to provide means for slidably coupling valve actuator 50 to valve 48. Sleeve 78 includes an internal seat 82. The terminal portion of sleeve 78 engages a shoulder 84 on cup 54. Thus, valve actuator 50 is formed to engage sleeve 58 and cup 54 to move valve 48 away from its blocking position.

Further advantageously, sleeves 58 and 78 cooperate to provide a slip joint enabling valve 48 to move away from seat 51 toward its venting position without valve diaphragm 64 moving away from its static position toward its actuating position. This feature allows valve 48 to function as a vacuum-relief valve. That is, when the fuel vapor pressure in the fuel tank 17 is reduced to Below a predetermined level, valve 48 can move away from its valve seat 51 without being actuated by valve actuator 50 to restore the fuel tank 17 to approximately atmospheric pressure.

Another advantage of sleeves 58 and 78 is that they cooperate to provide a portion of a conduit for transmission of a small volume of fuel vapor to venting control chamber 62 to provide the actuation signal to diaphragm 64. As has been noted, the fuel vapor signal must be transported from lower chamber 24 to venting control chamber 62 to perform its function.

Apparatus 10 is thus provided with a conduit aligned along the central longitudinal axis of housing 12. This "concentric" construction provides numerous advantages. For example, the concentric arrangement allows for a relatively large diameter cup 54 with a small amount of travel between the blocking position and the venting position. This permits quicker response without enlarging the diameter of opening 55.

In addition, the present arrangement, by providing a relatively large volume chamber 75 for venting, allows for reduced fuel vapor velocity through opening 55. This is desirable because at higher fuel vapor velocities, entrained droplets of liquid fuel have a greater tendency to carry over through opening 55 to pass eventually to canister 22, reducing its effectiveness. The present arrangement further allows for the use of a relatively large diameter diaphragm 64 which is highly sensitive to even low levels of tank pressure while at the same time maintaining a relatively small diameter of housing 12. The conduit includes a first portion and a second portion movable relative to the first portion to define an intermediate portion. A tube 86 provides the first portion of the conduit, while sleeves 58 and 78 cooperate to provide the second portion of the conduit.

Tube 86 projects upward from flow shield 28 along a central axis of housing 12. Tube 86 includes an inlet opening 88 placing tube 86 in fluid communication with fuel vapor in lower chamber 24. Tube 86 terminates in an outlet opening 90. Tube 86 is also provided with a retaining barb 89 to assist in retaining partition 16 in its proper position, preventing partition 16 from binding as cup 54 moves relative to tube 86 during venting.

As shown in FIG. 1, outlet opening 90 is aligned with inlet opening 60 of sleeve 58 and lies in axially spaced apart relationship therewith when valve 48 is in its blocking position, creating an intermediate portion 92 of the conduit. By contrast, when valve 48 is moved to its venting position (not shown) the terminal portion of tube 48 may contact the inner wall of cup 54, thus bringing together outlet opening 90 and inlet opening 60.

When outlet opening 90 and inlet opening 60 lie spaced apart as shown in FIG. 1, fuel vapor escaping through outlet opening 90 into intermediate portion 92 might of course dissipate in upper chamber 26 rather than entering inlet opening 60 as is desired. In addition, fuel vapor entering upper chamber 26 through inlet openings 32 would be able to pass into intermediate portion 92.

This would have a particularly undesirable impact on the "closing point" of valve 48—i.e., the pressure at which valve 48 will return to its blocking position from its venting position to prevent further venting. If venting fuel vapor were allowed to enter interior region 56 and pass through opening 60 into sleeves 58, 78 to eventually reach venting control chamber 62, such fuel vapor might apply an unwanted actuating force to diaphragm 64. This would delay movement of diaphragm 64 back to its static position, and hence would delay movement of valve 48 back to its blocking position. Flexible partition 16 assists in preventing this problem by providing a barrier preventing fuel vapor venting through upper chamber 26 along the vent path from entering intermediate portion 92.

Flexible partition 16 is preferably a cylindrical rolling membrane composed of a low durometer liquid-resistant elastomer. Partition 16 includes an outer peripheral edge 96 sealingly engaging a cylindrical seat 98 formed on the interior surface of cup 54. Peripheral edge 96 is held against seat 98 in part by the force of spring 52. Intermediate region 92, then, is defined by the inner wall of cup 54 and partition 94.

When partition 16 is exposed to excessive fuel vapor pressure from fuel vapor entering upper chamber 26 through inlet openings 32, partition 16 will flex and may, under extreme conditions, unseat from seat 98, causing undesirable intermixing of fuel vapor in vent path and fuel vapor exiting outlet opening 90 of tube 86. Apparatus 10 is also provided with the rollover-float valve assembly 18 as previously noted.

Rollover-float valve assembly 18 and valve assembly 14 are linked in fluid communication by an inlet opening 88 formed in the flow shield 28. The flow shield 28 includes a frustoconical valve seat 101 that defines the opening 88 and is sized to receive the float valve 19 in sealing engagement therewith. The flow shield 28 of housing 12 includes a vent hole 102 therethrough to place the upper chamber 26 in fluid communication with lower chamber 24.

Lower chamber 24 of housing 12 is defined by a cylindrical wall 104 defining hollow interior cavity 106 sized to receive the float valve 19 therein. Float valve 19 is movable within the lower chamber 24 between an open position (illustrated in FIG. 1) allowing flow of fuel vapor through the inlet opening 88 and a closed position (illustrated in FIG. 2) preventing flow of fuel vapor and liquid fuel 87 through the inlet opening 88.

Figure 2:
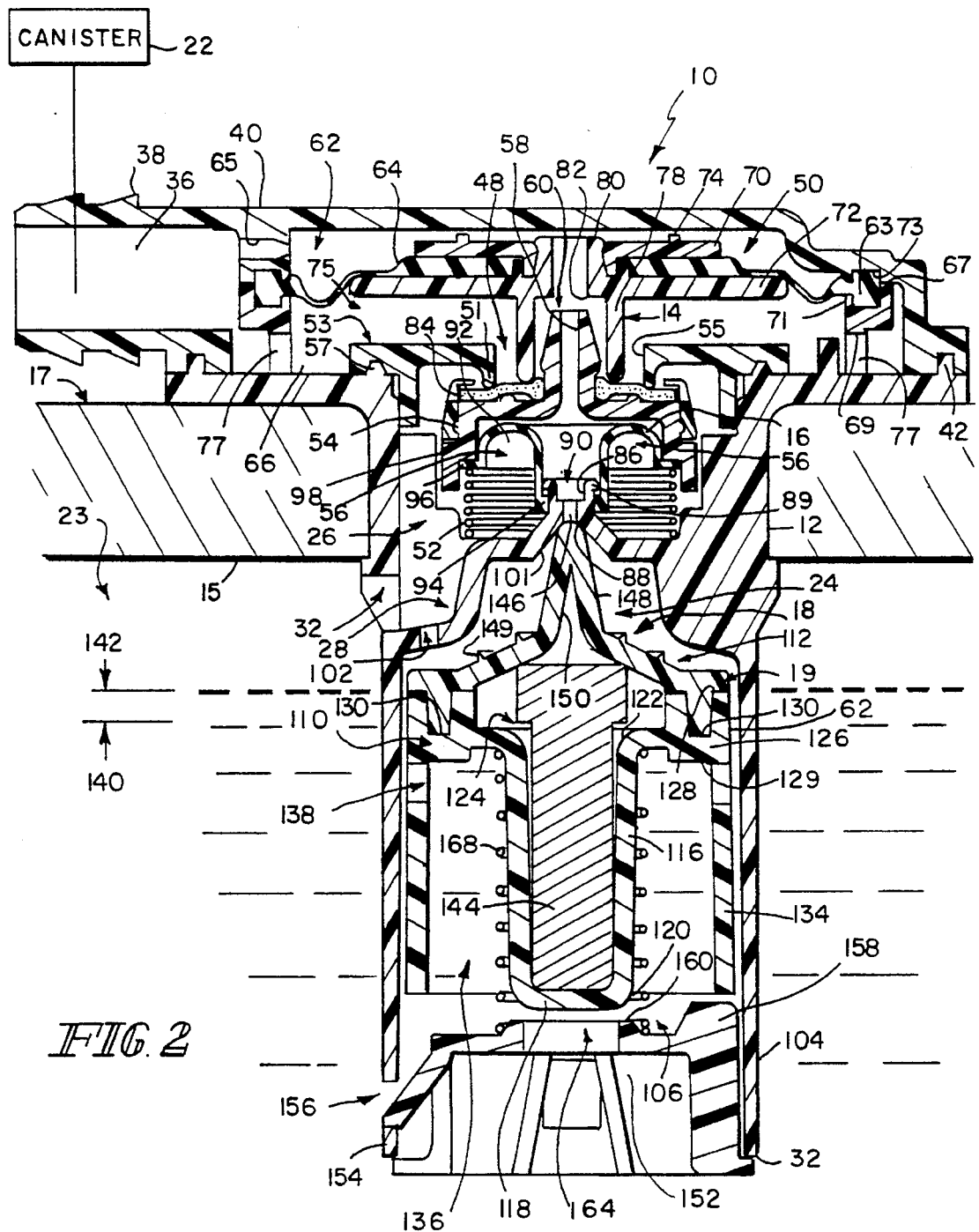
FIG. 2 is a view of the tank venting control apparatus of FIG. 1 showing the float valve after fluid has risen in the fuel tank past the vents and the float valve has "snapped" to a closed position away from the retainer, blocking the venting of fuel vapor and providing an overfill shut-off function.

Float valve 19 functions as a sensitive liquid discriminator, in that liquid fuel 87 must substantially fill the cavity 106 of the lower chamber 24, as shown by arrow 140 in FIG. 2, before the float valve 19 will snap (e.g. move quickly) to the closed position, preventing flow of fuel vapor and liquid fuel 87 through inlet opening 88 when the vehicle fuel tank 17 is at a normal upright attitude as shown in FIG. 2. Significantly then, the float valve 19 prevents the escape of fuel vapor and liquid fuel 87 from the fuel tank 17 at high levels of fuel 87, thus assisting in preventing a user from overfilling the fuel tank 17. In addition, float valve 19 operates to block the flow of fuel vapor through the inlet opening 88, thereby facilitating the rapid closure of valve assembly 14 to minimize liquid carryover from fuel tank 17 to vapor recovery canister 22. Moreover, assembly 18 provides rollover closure functions during rollover of a vehicle (not shown) carrying fuel tank 17.

Float valve 19 is illustratively positioned in the lower chamber 24 as shown in FIGS. 1 and 2. The float valve 19 of assembly 18 includes a lower float wall 108. Typically, the lower float wall 108 includes an inverted cup-shaped body 110 having a diameter such that the valve 19 may be movably received within the lower chamber 24 of housing 12. The float valve 19 further includes a hollow upper float wall 109. Typically, the upper float wall 109 is a cap 112 mounted on the body 110 to seat in sealing engagement with valve seat 101 to block flow of fuel vapor and liquid fuel 87 from lower chamber 24 through inlet opening 88. This feature and operation of a rollover valve is described in U.S. Pat. No. 5,065,782, relevant portions of which are incorporated herein by reference.

Additionally, body 110 of valve 19 includes a cylindrical barrier 116. This barrier 116 has a circular seat portion 118 (i.e. a second downwardly-presented surface having a predetermined cross-sectional area) positioned at its bottom end 120 and an opposite mouth 122. The mouth 122 defines a hollow region 124 extending into the barrier 116. Additionally, the body 110 includes an annular lip 126 that extends radially outwardly from the mouth 122 and includes an upper side 128 and an opposite underside 129 (i.e. a first downwardly-presented surface having a predetermined cross-sectional area). Upper side 128 of lip 126 includes a groove 130 sized to receive a peripheral depending tab 132 of cap 112. Groove 130 aligns with tab 132, cooperating therewith to provide a secure mounted engagement between the cap 112 and the body 110. Moreover, body 110 includes a skirt 134 extending about the cylindrical barrier 116 to form a float chamber 136 bounded by the skirt 134, underside 129 of lip 126, and barrier 116.

Illustratively, the skirt 134 is formed to include vents 138 situated therethrough. These vents 138 are positioned substantially close to the annular lip 126 and within a small distance, typically one millimeter of the desired buoyant point of the float valve 19. Illustratively, the vents 138 are positioned through the skirt 134 adjacent the underside 129 of the lip 126.

This positioning of the vents 138 through the skirt 134 adjacent the annular lip 126 produces "snap" closure action. As previously discussed, the float valve 19 "snaps" (e.g. moves quickly) once the buoyant force of the float valve 19 (the product of cross-sectional area of the float valve 19, submerged height (e.g. dimension 25 in FIG. 1) of the float valve 19, and the specific gravity of fluid (e.g. liquid fuel 87) surrounding the float valve 19) plus compression force of spring 168 overcomes the weight of the float valve 19. The presence of the vents 138 cause the liquid fuel 87 to rise through the float chamber 136. The liquid fuel 87 therefore first encounters only a small cross-sectional area of the skirt 134 and the seat portion 118 of the barrier 116. This small cross-sectional area effectively retards the movement of the float valve 19 in response to rising fluid (e.g. liquid fuel 87) submerging the float valve 19. Illustratively valve "snaps" shut only after the liquid fuel 87 has risen to a fluid level, shown by arrow 140, in FIG. 2.

At the fuel level illustrated by arrow 140, the liquid fuel 87 has just previously entered the vent 138 and engaged the underside 129 of lip 126 which causes the float valve 19 to behave again as a solid cross-section structure. The cross-section of the body 110 which is substantially greater than that of the skirt 134 and barrier 116. The sudden and dramatic increase in the cross-sectional area component coupled with the already increased submerged height component significantly increases the buoyant force of the float valve 19. This rapid increase in the buoyant force, when coupled with the constant compression force of spring 168, instantly overcomes the weight of the float valve 19, resulting in a "snap" closure (e.g. quick or sudden movement of float valve 19 to the closed position shown in FIG. 2). Thus, the sudden increases in fluid level, not rising to the level of a pre-selected closure condition, will not cause the float valve 19 to move. Therefore the float valve 19 may be positioned approximately one millimeter below the closed position (i.e. very close to the closed position). In turn, there is less tendency of premature closure a high flow rates, and less hysteresis on reopening as shown by arrow 142 with fluid level drop.

Illustratively, the body 110 further includes a weighted member 144 within the hollow region 124 of the barrier 116. The weighted member 144 is seated upon the seat portion 118 to increase the weight of the float valve 19 and thus manipulate the amount of buoyant force necessary to "snap" the float valve 19 to the closed position. It is understood that the weighted member 144 may take a variety of forms in order to cooperate with the hollow region 124 within the barrier 116.

The cap 112 of the float valve 19 is formed to cover the mouth 122 of the barrier 116 to make the hollow region 124 of the body gas-tight. In addition, the cap 112 seals the inlet opening 88 formed in the flow shield 28 of the housing 12. Cap 112 illustratively includes a sealing tip 146 sized to sealingly engage valve seat 101 to prevent flow of fuel vapor and liquid fuel 87 through the inlet opening 88 when the float valve 19 is in the closed position. Further, cap 112 has an outer wall 148 facing the flow shield 28 of the housing 12 and an opposite inner side 150 having the peripheral tab 132, which is mounted within groove 130 of lip 126.

Preferably, a plurality of rings 149 are formed on the outer wall 148 of cap 112 to prevent liquid fuel 87 migration across the wall 148 as fuel vapor passes through the inlet openings (not shown) through the cylindrical wall 104 of housing 12, into lower chamber 24, and then to inlet opening 88. Thus, rings 149 assist in preventing liquid fuel 87 carry over into the tube 86.

In particular, rollover-float valve assembly 18 includes, in addition to float valve 19, a retainer 152. Lower chamber 24 is bounded by the flow shield 28 and by the retainer 152 positioned at the lower end 32 of lower chamber 24. Illustratively, retainer 152 is provided with lugs 154 which can be snap-fit into receptacles 156 formed in the lower chamber 24 and a plurality of vertically extending fins 158 positioned in approximately equally spaced intervals about the circumference of retainer 152. Retainer 152 further includes a top surface 160 formed to include a circular opening 164 through which liquid fuel 87 passes at particularly high levels of liquid fuel 87 in the fuel tank 17, e.g., during sloshing conditions in the fuel tank 17 and during refueling. In addition, retainer 152 includes a circular ridge 166 about the circumference of opening 164 on the surface 148 to assist in maintaining the spring 168 in its proper position on retainer 152.

Spring 168 extends into the float chamber 136 defined by the body 110. Spring 168 acts between the retainer 152 and the underside 129 of lip 126 to assist in raising float valve 19 toward its closed position against the flow shield 28. Thus, float valve 19 moves in response to rising liquid fuel 87 from the fuel tank 17 to selectively prevent liquid fuel 87 and fuel vapor from flowing through inlet opening 88 to reach the valve assembly 14 housed in the upper chamber 26 of housing 12.

Float valve 19 is designed both for the purposes of, for example, (1) preventing liquid fuel 87 from passing from the fuel tank 17 through the lower chamber 24 to venting control chamber 62, and (2) providing a back pressure sufficient to trigger the automatic shut-off mechanism provided in a fuel filler nozzle (not shown) so as to prevent the introduction of excess liquid fuel 87 into the fuel tank 17 during the refueling. Rollover-float valve assembly 18 is also designed to snap quickly to a closed position (see FIG. 2) preventing flow of fuel vapor and liquid fuel 87 through inlet opening 88 when exposed to sloshing or vertical surges of liquid fuel 87. The term "sloshing" as used herein refers to the tendency of liquid fuel 87 to form waves moving essentially horizontally in response to vehicle vibration or rocking. The float valve 19 in accordance with the present invention has the practical effect of being more responsive to sudden sharp changes in fuel level, such as may occur when a vehicle is driven on a very rough road.

During normal vehicle operation with relatively low levels of liquid fuel 87 in the fuel tank 17, float valve 19 rests in the open position (as shown in FIG. 1) allowing flow of fuel vapor from the fuel tank 17 to flow from the lower chamber 24 through the inlet opening 88 and into the intermediate portion 92 of the conduit in the upper chamber 26 of the housing 12. However, when apparatus 10 is exposed to sloshing or to vertical surges of liquid fuel 87, it is anticipated that a relatively large volume of liquid fuel 87 could become entrained in fuel vapor and could be carried over through discharge orifice 36 unless float valve 19 quickly moves to a closed position in sealing engagement with flow shield 28. Thus, rollover-float valve assembly 18 is designed and configured to "snap" quickly to a closed position, as shown in FIG. 2, when such pre-selected conditions exist.

The float valve 19 is designed to remain in its stationary open position and be unresponsive to minor, insignificant changes in fluid level within the fuel tank 17. As was previously discussed, the vents 138 allow the fluid 87 to rise within the float chamber 136. The rising fluid 87 encounters only a minor cross-sectional area of the skirt 134, which temporarily depresses the buoyant force of the float valve 19. When however, conditions exist which cause the liquid fuel 87 to rise to a level which it flows into the vents 138, the rising fluid 87 encounters a significantly larger solid cross-sectional area. The combination of this sudden increase in cross-sectional area and the submerged height of the valve 19 causes a significant increase in the buoyant force of the float valve 19 which in combination with the compression force of the spring 168 overcomes the weight of the float valve 19. Therefore, it appears that a somewhat instantaneous "snap" closure of the float valve 19 occurs within the fuel tank 17.

In an alternative embodiment of the present invention, a float valve 219 without a skirt such as skirt 134 is illustrated in FIG. 3. The float valve 219 includes a hollow upper float wall 209 which is integral with a lower float wall 208. The lower float wall 208 includes a hollow barrier 216 formed for receiving a weighted member 244 therein and an annular lip 226 extending radially about the barrier 216. Thus, the barrier 216 and the lip 226 define a float chamber 236 when positioned within the lower chamber 24 of apparatus 10. In addition, one or more ribs (not shown) of the type shown in FIG. 4 may depend from the annular lip 226 to aid in stabilizing the positioning of the float valve 219 within the lower chamber 24. In operation, rising liquid fuel 87 surrounds the barrier 216 and engages a first downwardly-presented surface 229 on annular lip 226 to cause the float valve 219 to "snap" and move upwardly in direction 218 to its closed position to block the flow of liquid fuel 87 and vapor through the assembly 10.

Another embodiment, illustrated in FIG. 4, includes a float valve 319 having a hollow upper float wall 309 affixed to a lower float wall 308. Lower float wall 308 includes a hollow barrier 316 formed for receiving a weighted member 344 therein and an annular lip 326 extending circumferentially about an upper end of the barrier 316. Thus, the hollow barrier 316, the lip 326, and the lower float wall 308 cooperate to define a float chamber 336 when positioned within the lower chamber 24 of apparatus 10. While, not necessary to effect the "snap" closure, ribs (320) may depend from the annular lip 326 to aid in stabilizing the positioning of the float valve 319 within the lower chamber 24. In operation, rising liquid fuel 87 surrounds the downwardly-extending hollow barrier 316 and engages a first downwardly-presented surface 329 on radially outwardly-extending annular lip 326 to cause the float valve 319 to "snap" and move upwardly in direction 318 to its closed position to block the flow of liquid fuel 87 and vapor through the assembly 10.

Illustratively, the float valves 19, 219, and 319 shown in FIGS. 1–4 can be made out of a plastics material such as acetal. However, float valve 419 shown in FIG. 5 is a unitary, solid core float valve made of a material with a higher specific gravity such as a phenolic material. Thus, the float valve 419 has a proper specific gravity due to proper material selection and does not need to include a gas-tight hollow chamber containing a weighted member as was disclosed for the float valve in connection with the embodiments of FIGS. 1–4. Float valve 419 includes a base 421, a closure member 423 appended to an upper end 425 of base 421, and a weighted member 427 depending from a lower end 429 of base 421.

Although the invention has been described in detail with reference to certain preferred embodiments, variations and modifications exist within the scope and spirit of the invention as described and defined in the following claims.

What is claimed is:

1. An apparatus for controlling venting of fuel vapor through a vent aperture in a fuel tank, the apparatus comprising a float valve having a vertical axis extending therethrough and including a base having an upper end and a lower end, an upwardly-extending closure member appended to the upper end of the base and formed to include a vent aperture closure cap, and a downwardly-extending, elongated, weighted unit depending from the lower end of the base, the lower end of the base having a first downwardly-presented surface of a predetermined cross-sectional area positioned on the float valve to lie at a position coinciding with the fluid level in the fuel tank when the vent aperture closure cap moves to a position closing the vent aperture in the fuel tank, the weighted unit having a second downwardly-presented surface positioned to lie in axially spaced-apart relation to the first downwardly-presented surface, the second downwardly presented surface having a cross-sectional area that is less than the predetermined cross-sectional area of the first downwardly-presented surface.

2. The apparatus of claim 1, wherein the base and weighted unit cooperate to define a sealed hollow chamber therein and a weighted member is positioned in the sealed hollow chamber.

3. The apparatus of claim 2, wherein the base is a cylindrical disk having a first axial height and the weighted unit is a cylindrical post having a second axial height greater than the first axial height.

4. The apparatus of claim 1, wherein the base is formed to include a hollow chamber containing a weighted member.

5. The apparatus of claim 1, wherein the weighted unit is formed to include a hollow chamber containing a weighted member.

6. The apparatus of claim 1, further comprising at least one axially extending guide rib having an upper end appended to the first downwardly-presented surface and a first side edge appended to an exterior surface of the weighted unit.

7. The apparatus of claim 6, further comprising a housing formed to include a chamber receiving the float valve for sliding movement therein and communicating with the aperture in the fuel tank, each axially extending guide rib having a second side edge lying in spaced-apart relation to the first side edge and slidably engaging an inner wall of the housing during sliding movement of the float valve in the housing.

8. The apparatus of claim 6, wherein the base is a disk having a cylindrical exterior side wall between the upper and lower ends, the weighted unit is a post having a cylindrical exterior side wall, the apparatus further comprises a plurality of axially extending guide ribs appended to the cylindrical exterior side wall of the post and arranged to lie in circumferentially spaced-apart relation to one another, and the cylindrical exterior side wall of the disk has a diameter of the cylindrical exterior side wall of the post.

9. The apparatus of claim 1, wherein the float valve is a unitary, solid core member defining at least the base and weighted member.

10. The apparatus of claim 9, wherein the float valve is made of a phenolic resin.

11. The apparatus of claim 1, wherein the float valve is a unitary member formed to include a gas-tight hollow chamber containing a weighted member therein.

12. The apparatus of claim 1, wherein the float valve is a two-piece member formed to include a gas-tight hollow chamber containing a weighted member therein.

13. The apparatus of claim 12, wherein the float valve includes a first piece defining the vent aperture closure cap and an upper portion of the base and a second piece defining a lower portion of the base and the weighted unit.

14. The apparatus of claim 1, wherein the weighted unit is an elongated axially extending post having a uniform width dimension traverse to the vertical axis along its axial length between the first and second downwardly-presented surfaces.

15. The apparatus of claim 14, wherein the elongated axially extending post is a cylinder having a uniform diameter along its axial length.

16. An apparatus for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a spring biasing the valve toward its blocking position, means for using fuel vapor from the fuel tank to move the valve against the spring toward its venting position, the using means including a venting control chamber receiving fuel vapor from the fuel tank and a conduit communicating fuel vapor from the fuel tank to the venting control chamber, the conduit having a first portion and a second portion movable relative to the first portion to define an intermediate portion, a flexible partition extending between the valve and the first portion to provide a barrier to prevent fuel vapor venting through the vent path from entering the intermediate portion, the flexible partition being deformable to maintain the barrier when the valve moves away from its blocking position toward its venting position, a float valve disposed in the valve housing and movable between a closed position blocking flow of fuel vapor and liquid fuel through the outlet and an open position, the float valve including an upper float wall, a lower float wall, and a gas-tight region formed between the upper and lower float wall, and the float valve becomes buoyant and snaps to the closed position following contact of the fluid with the lower float wall, and means for retaining the float valve within the housing, the retaining means being coupled to the housing.

17. The apparatus of claim 16, wherein the upper float wall includes a cap and the lower float wall includes a body, and the body has a hollow cylindrical barrier, an annular lip coupled to the cap and extending from the hollow cylindrical barrier to form a float chamber bounded by the hollow cylindrical barrier and the annular lip.

18. The apparatus of claim 17, wherein the body further includes means for displacing fuel vapor from the float chamber.

19. The apparatus of claim 18, wherein the displacing means is a skirt depending from the annular lip and having a vent positioned through the skirt so that fuel vapors are channeled out from the float chamber and into the housing.

20. The apparatus of claim 19, wherein the vent is positioned adjacent the annular lip.

21. The apparatus of claim 17, wherein the body further includes skirt depending from the annular lip, the skirt having a vent positioned adjacent the annular lip.

22. The apparatus of claim 21, wherein the skirt includes a plurality of vents positioned in spaced-apart relation adjacent the annular lip of the body.

23. The apparatus of claim 17, further comprising a weighted member and wherein the hollow cylindrical barrier includes a mouth coupled to the annular lip and a seat portion positioned at an opposite end, and the weighted member rests upon the seat portion.

24. The apparatus of claim 23, wherein the annular lip extends about the periphery of the mouth, the cap includes an inner surface formed to define a cavity therein, and the weighted member partially fills the cavity when the cap is securely mounted on the annular lip of the body.

25. The apparatus of claim 24, further comprising a compression spring extending between the retaining means and the annular lip of the body.

26. The apparatus of claim 16, wherein the housing includes an upper chamber surrounding the valve, a lower chamber surrounding the float valve, and a flow shield separating the upper and lower chambers, and the upper float wall engages the flow shield in the closed position.

27. The apparatus of claim 26, further comprising means for normally urging the upper float wall toward the flow shield of the housing, the urging means extending between the retaining means and the lower float wall.

28. An apparatus for controlling venting of fuel vapor through an aperture in a fuel tank, the apparatus comprising a housing mounted in the aperture and formed to include an outlet, the housing defining a vent path for fuel vapor between the fuel tank and the outlet, a valve assembly mounted in the housing and including a valve and a valve actuator, the valve being movable between a blocking position blocking flow of fuel vapor between the fuel tank and the outlet along the vent path and a venting position allowing flow of fuel vapor between the fuel tank and the outlet along the vent path, the valve actuator including a venting control chamber receiving fuel vapor from the fuel tank to apply pressure to the valve actuator so that the valve actuator urges the valve toward its venting position, a conduit communicating fuel vapor from the fuel tank to the venting control chamber, the conduit including a first portion and a second portion movable relative to the first portion to define an intermediate portion, a flexible partition extending between the valve and the first portion to provide a barrier to prevent fuel vapor venting through the vent path from entering the intermediate portion, float means for blocking flow of fuel vapors and liquid fuel through the outlet under conditions of increasing fuel vapor pressure, the float means including a hollow upper float wall, a lower float wall, and a gas-tight hollow region formed between the upper and lower float walls, the lower float wall having means for snapping the upper float wall toward the valve assembly to block the flow of liquid fuel through the outlet following engagement of the lower float wall with rising fluid, and retainer means for retaining the float means within the housing, the retaining means being coupled to the housing.

29. The apparatus of claim 28, wherein the lower float wall includes a body coupled to the upper float wall, and the body has a barrier, an annular lip extending radially outwardly from the barrier, and a skirt extending about the barrier to form a float chamber bounded by the barrier, the annular lip, and the skirt, the skirt being formed to include a vent therethrough adjacent the annular lip so that the upper float wall snaps toward the valve assembly to block the flow of liquid fuel through the outlet following flow of rising fuel within the flow chamber through the vent.

30. The apparatus of claim 29, wherein the skirt is formed to include a plurality of vents positioned in spaced-apart relation to one another about the circumference of the body.

31. An apparatus for controlling venting of fuel vapor through an aperture in a vehicle fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, the valve being formed to include a first flow channel having an inlet opening into the fuel tank, a valve actuator formed to include a second flow channel having an inlet opening sized to mate with the first flow channel, the valve actuator being mounted in the housing and movable relative to the valve in response to fuel vapor pressure from the fuel tank between a static position allowing the valve to occupy its blocking position and an actuating position urging the valve towards its venting position, means for slidably coupling the valve actuator to the valve to maintain the first and second flow channels in fluid communication so that the valve moves from its blocking position toward its venting position without moving the valve actuator from its static position to its actuating position and without breaking fluid communication between the first and second flow channels when the fuel vapor pressure in the fuel tank is reduced to below a predetermined level, a float valve disposed in the valve housing and movable between a closed position blocking flow of fuel vapor and liquid fuel through the outlet and an open venting position, the float valve having a hollow upper float wall, a lower float wall, and a gas-tight hollow region formed between the upper and lower float walls, the lower float wall being formed to include means for snapping the upper float wall toward the closed position upon the fluid engaging the snapping means, and a lower retainer formed to hold the float valve within the housing.

32. An apparatus for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, the valve being formed to include a first flow channel, a spring biasing the valve toward its blocking position, means for using fuel vapor passing from the fuel tank through the first flow channel to move the valve against the spring toward its venting position, the using means including a valve actuator for urging the valve toward its venting position and a venting control chamber receiving fuel vapor passing from the fuel tank through the first flow channel provided in the valve to apply pressure to the valve actuator, means for slidably coupling the valve actuator to the valve to permit relative movement therebetween so that the valve moves from its blocking position toward its venting position and away from the valve actuator when the fuel vapor pressure in the fuel tank is reduced to below a predetermined level, a float valve being disposed in the valve housing and movable between a closed position blocking flow of fuel vapor and liquid fuel through the outlet and an open position allowing flow of fuel vapor through the outlet, the float valve having an upper float wall, a lower float wall, and a gas-tight hollow region between the upper and lower float walls, and the lower float wall including an annular lip positioned within the valve housing so that the upper float wall snaps about one millimeter to the closed position following flow of fluid against the annular lip, and a weighted member positioned in the gas-tight hollow region.

33. The apparatus of claim 32, wherein the upper float wall includes a cap and the lower float wall further includes substantially hollow barrier coupled to the annular lip and a skirt extending from the annular lip about the barrier to form a float chamber bounded by the annular lip, the barrier, and the skirt, and the skirt is formed to include a vent positioned adjacent the annular lip.

34. The apparatus of claim 33, wherein the skirt includes a plurality of vents positioned in spaced-apart relation adjacent the annular lip.

35. An apparatus for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a spring biasing the valve toward its blocking position, means for using fuel vapor from the fuel tank to move the valve against the spring toward its venting position, the using means including a valve actuator using fuel vapor from the fuel tank to urge the valve toward its venting position, a venting control chamber receiving fuel vapor from the fuel tank to apply pressure to the valve actuator, and a conduit communicating fuel vapor from the fuel tank to the venting control chamber, the conduit including a first portion and a second portion movable relative to the first portion to define an intermediate portion, the second portion including an upstanding sleeve movable with the valve and a depending sleeve movable with the valve actuator and slidable engaging the upstanding sleeve so that the valve can move away from the valve actuator toward its venting position in response to reduction of pressure in the fuel tank below a predetermined level, a flexible partition extending between the valve and the first portion to provide a barrier to prevent fuel vapor venting through the vent path from entering the intermediate portion, the flexible partition being deformable to maintain the barrier when the valve moves away from its blocking position toward its venting position, a float valve being disposed in the valve housing and movable between a closed position blocking flow of fuel vapor and liquid fuel through the outlet and an open venting position, the float valve including an upper float wall, a lower float wall, and a gas-tight hollow region between the upper and lower float walls, and the lower float wall including an annular lip positioned within the valve housing so that float valve becomes buoyant and snaps to the closed position following flow of the rising fuel against the annular lip, a lower retainer coupled to the housing and formed to hold the float valve within the housing.

36. The apparatus of claim 35, wherein the upper float wall includes a cap, the lower float wall includes a body, the body includes a barrier coupled to the annular lip, and a skirt depending from the annular lip to form a float chamber bounded by the annular lip, the barrier, and the skirt, the skirt being formed to include a vent therethrough adjacent the annular lip.

37. An apparatus of claim 36, wherein the skirt includes a plurality of vents positioned in spaced-apart relation therethrough.

38. The apparatus of claim 35, wherein the housing is formed to include an upper chamber and a lower chamber, the upper chamber contains the valve and the valve actuator, the valve includes an inverted cup defining an interior region, the housing further includes a flow shield separating the upper and lower chambers and providing a conduit communicating fuel vapor from the fuel tank to the interior region of the inverted cup, and the float valve is movable to the closed position against the flow shield to close the conduit.

39. An apparatus for preventing introduction of excess fuel into a fuel tank having an interior region and a top wall, the apparatus comprising a valve housing adapted to be mounted in the top wall of the fuel tank, the valve housing being formed to include a vapor inlet opening communicating with the interior region of the fuel tank, a vapor outlet, a passageway interconnecting the vapor inlet opening and the vapor outlet, and a flow shield positioned within the passageway, and a float valve disposed in the valve housing and movable between an open position allowing flow of fuel vapor through the outlet and a closed position against the flow shield preventing flow of fuel vapor through the outlet, the float valve having an upper float wall formed for engagement with the flow shield in the closed position and a lower float wall formed to include a lip and means for snapping the upper float wall to the closed position upon engagement of rising fluid with the lip.

40. The apparatus of claim 39, wherein the upper flow wall is integral with the lower float wall to form a gas-tight hollow region therebetween.

41. The apparatus of claim 39, wherein the upper float wall includes a cap and the lower float wall includes a body, the body has a barrier coupled to the lip so that the lip extends radially outwardly from the barrier and a skirt the extends from the lip and about the barrier to create a float chamber defined by the barrier, the annular lip, and the skirt, and the skirt is formed to include a vent positioned adjacent the annular lip.

42. An apparatus for preventing introduction of excess fuel into a fuel tank having an interior region and a top wall, the apparatus comprising a valve housing adapted to be mounted in the top wall of the fuel tank, the valve housing being formed to include a vapor inlet opening communicating with the interior region of the fuel tank, a vapor outlet, a passageway interconnecting the vapor inlet opening and the vapor outlet, and a flow shield positioned within the passageway, and a float valve disposed in the valve housing and movable between an open position allowing flow of fuel vapor through the outlet and a closed position against the flow shield preventing flow of fuel vapor through the outlet, the float valve having an upper float wall formed for engagement with the flow shield in the closed position and a lower float wall formed to include a hollow barrier having a substantially constant cross-sectional area and a lip extending radially outwardly from the barrier, the lip having a cross-sectional area greater than cross-sectional area of the barrier so that a product of a cross-sectional area of the float valve, submerged height of the float valve, and specific gravity of fluid surrounding the float valve overcomes the weight of the float valve when the rising fluid engages the lip to cause the upper float wall to move toward the closed position.

43. The apparatus of claim 42, further comprising a lower retainer coupled to the housing in spaced-apart relation to the top wall and the float valve is situated within the housing between the lower retainer and the flow shield.

44. The apparatus of claim 43, further comprising a spring extending between the lip and the lower retainer and the upper float wall moves toward the closed position when the product of the cross-sectional area of the float valve, submerged height of the float valve, and specific gravity of fluid surrounding the float valve plus a compression force from the spring overcomes the weight of the float valve.

* * * * *